(12) United States Patent
Fortenbery et al.

(10) Patent No.: US 7,032,741 B1
(45) Date of Patent: Apr. 25, 2006

(54) CONVEYOR SYSTEM HAVING A SPEED CONTROL CHUTE

(75) Inventors: J. David Fortenbery, Charlotte, NC (US); David Patrick Erceg, Concrod, NC (US)

(73) Assignee: Mantissa Corporation, Charlotte, NC (US)

( * ) Notice: Subject to any disclaimer, the term of this patent is extended or adjusted under 35 U.S.C. 154(b) by 0 days.

(21) Appl. No.: 10/855,878

(22) Filed: May 27, 2004

(51) Int. Cl.
*B65G 47/04* (2006.01)

(52) U.S. Cl. ...................... 198/530; 198/531

(58) Field of Classification Search ............... 198/530, 198/531, 532; 193/32
See application file for complete search history.

(56) References Cited

U.S. PATENT DOCUMENTS

| | | | | |
|---|---|---|---|---|
| 1,092,602 A | * | 4/1914 | Smith et al. ................. | 193/32 |
| 2,120,440 A | * | 6/1938 | Kramer et al. ............. | 273/121 A |
| 2,781,947 A | * | 2/1957 | Webster et al. ............ | 221/296 |
| 2,800,991 A | * | 7/1957 | Manierre .................... | 198/524 |
| 3,158,245 A | * | 11/1964 | Budjinski et al. ........... | 193/32 |
| 3,221,380 A | * | 12/1965 | Reighart ..................... | 222/77 |
| 4,010,841 A | * | 3/1977 | Bonzack ..................... | 198/357 |
| 4,199,054 A | * | 4/1980 | Wirsbinski ................ | 198/735.4 |
| 6,622,849 B1 | * | 9/2003 | Sperling .................... | 198/533 |
| 6,715,599 B1 | * | 4/2004 | Fortenbery et al. ......... | 198/360 |

* cited by examiner

*Primary Examiner*—Joe Dillon, Jr.
(74) *Attorney, Agent, or Firm*—MacCord Mason PLLC

(57) ABSTRACT

A package sorting conveyor apparatus comprising: a conveying track; a conveyor chute downstream from said conveying track; a speed control device for controlling the speed of packages in said chute; and at least one unloading station downstream from said conveyor chute. In the preferred embodiment, the package sorting conveyor apparatus comprises: a transition zone funnel for receiving packages from said conveying track and directing the package into said conveyor chute, said transition zone funnel including a positioner assembly for selectively positioning the outlet of said transition zone funnel between at least a first and a second position along at least two axes. Also in the preferred embodiment, the speed control device comprises: an attachment portion for attaching said speed control apparatus to a support structure; a package interface portion for contacting the packages; and an integral hinge between said attachment portion and said package interface portion.

36 Claims, 4 Drawing Sheets

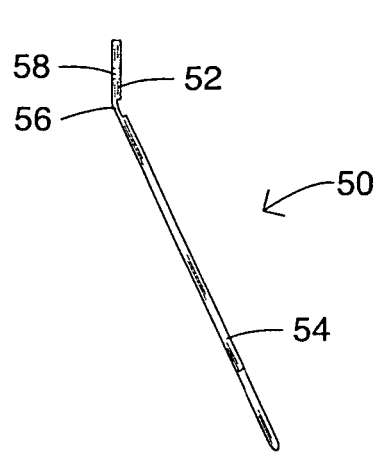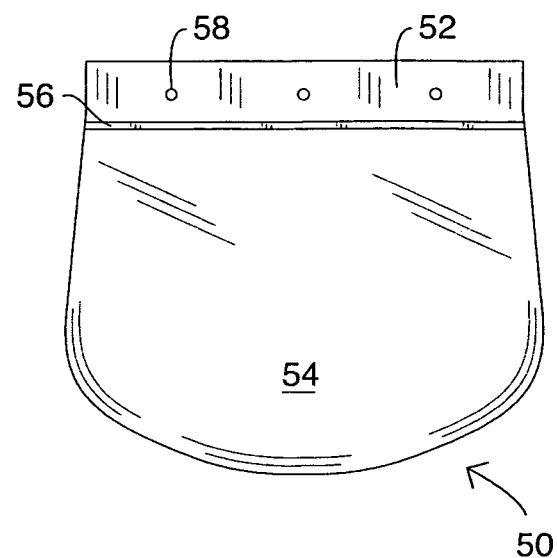
FIG. 3　　　　　　　FIG. 4
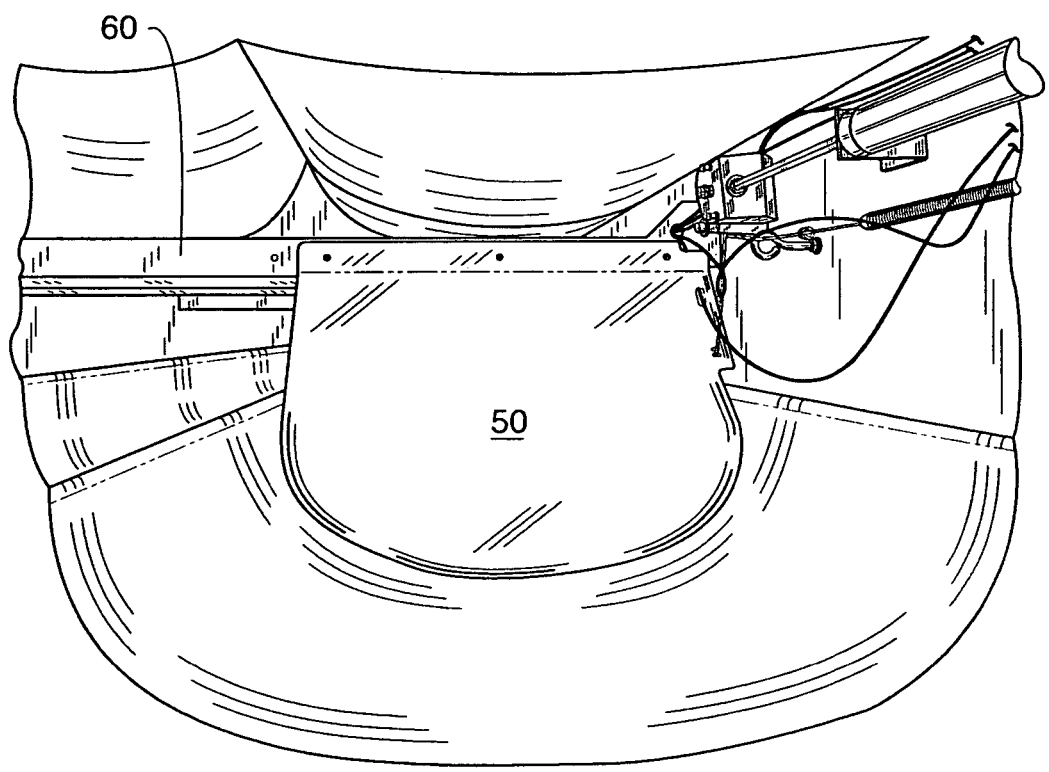
FIG. 5

CONVEYOR SYSTEM HAVING A SPEED CONTROL CHUTE

BACKGROUND OF THE INVENTION (1) Field of the Invention

The present invention relates generally to package sorting conveyors and, more particularly, to a conveyor system having a conveying track, at least one unloading station, and an improved speed control chute.

(2) Description of the Prior Art

Conveyor systems having a number of individual carrying carts have been used for many years to carry and sort packages such as shoes and apparel or other items such as mail. Conventional tilt tray sorters discharge their goods onto individual chutes located near each packer. For example, U.S. Pat. No. 5,054,601 to Sjogren et al. discloses a package-sorting conveyor comprised of a train of tilt tray carriers coupled in tandem to form a continuous loop. Each carrier includes a pivotally mounted tilt tray normally maintained in an upright position. The carriers are moved around the loop by a series of motors spaced around the loop. Branching out from the loop are out-feed positions for receiving packages from the carriers. When a particular carrier holding a particular package to be sorted reaches a selected out-feed position, an actuator tilts the tray to dump the package into a transition zone funnel or other package-receiving device.

Conventional sorting conveyors sort boxes and bags by providing package-receiving devices at out-feed positions that have a roller-lined surfaces for boxes, and more steeply declined package-receiving chutes at different out-feed positions without rollers for bags. Thus a fixed number of box out-feed positions and bag out-feed positions are established on the conveyor. Alternatively, distribution centers may use two conventional sorting conveyors, one dedicated to boxes and one to bags. Therefore, efficiencies could be realized if the boxes could be sorted into the more steeply declined package-receiving chutes. The problems associated with doing so, however, include damaged to the boxes in the chutes because the weight of the boxes and the speed in the chute.

Thus, there remains a need for a new and improved conveyor system having a conveying track, at least one unloading station, and an improved chute where the speed of the boxes moving there through can be controlled to prevent inflicting damage to the boxes.

SUMMARY OF THE INVENTION

The present invention is directed to a package sorting conveyor apparatus comprising: a conveying track; a conveyor chute downstream from said conveying track; a speed control device for controlling the speed of packages in said chute; and at least one unloading station downstream from said conveyor chute. In the preferred embodiment, the package sorting conveyor apparatus comprises: a transition zone funnel for receiving packages from said conveying track and directing the package into said conveyor chute, said transition zone funnel including a positioner assembly for selectively positioning the outlet of said transition zone funnel between at least a first and a second position along at least two axes. Also in the preferred embodiment, the speed control device comprises: an attachment portion for attaching said speed control apparatus to a support structure; a package interface portion for contacting the packages; and an integral hinge between said attachment portion and said package interface portion.

In the preferred embodiment, the apparatus includes a support structure attached to the speed control device. The attachment portion of the speed control device includes an edge at least partially defining an opening for inserting a fastener. The speed control device includes a biasing device for biasing the package interface portion. The biasing device includes a spring. The biasing device is adjustable for varying the bias applied to the package interface portion. The package interface portion of the speed control device is translucent for viewing packages through the package interface portion. The speed control device includes an actuator for selectively disengaging the speed control device. The speed control device includes a linkage between the actuator and the package interface portion. The speed control device includes an accumulator for accumulating packages upstream from the end of the conveyor chute. The accumulator may be selectively engaged.

In the preferred embodiment, the package sorting conveyor apparatus includes a transition zone funnel including: an inlet adjacent to the conveying track at the unloading station; an upwardly inclined downstream wall located downstream of the inlet for preventing packages from tipping over; and an outlet located downstream from the upwardly inclined downstream wall for discharging packages from the funnel. The inlet is substantially flat to receive the package being discharged by the package sorting conveyor system. The inlet is wider than the front edge of the package providing a wider range of curvature enabling the package to slide off the package sorting conveyor system onto the inlet. The upwardly inclined downstream wall has a radius of curvature of between about 6 inches and 2½ feet. The upwardly inclined downstream wall has a radius of curvature of about 1 foot.

In the preferred embodiment, the forward direction of the package changes about 90° from its initial direction on the conveying track to its direction at the outlet of the transition zone funnel. The surface of the transition zone funnel is a low-friction, wear-resistant polymeric material. The material is a high-density polyethylene. The positioner assembly for selectively positioning between at least a first and a second position along at least two axes includes at least one pivot point and a drive means. The pivot point includes a ball joint. The pivot point also includes an inclined axis. The pivot point includes at least two independent pivots. The two independent pivots include a rotary joint and a hinge joint. The drive means includes a rotary actuator. The drive means includes a linear actuator. The linear actuator is a fluid actuator.

Accordingly, one aspect of the present invention is to provide a package sorting conveyor apparatus comprising: a conveying track; a conveyor chute downstream from said conveying track; a speed control device for controlling the speed of packages in said chute; and at least one unloading station downstream from said conveyor chute.

Another aspect of the present invention is to provide a speed control apparatus for controlling the speed of packages in a conveyor chute comprising: an attachment portion for attaching said speed control apparatus to a support structure; a package interface portion for contacting the packages; and an integral hinge between said attachment portion and said package interface portion.

Still another aspect of the present invention is to provide a package sorting conveyor apparatus comprising: a conveying track; a conveyor chute downstream from said conveying track; a speed control device for controlling the speed of packages in said chute comprising: (a) an attachment portion for attaching said speed control apparatus to a support structure; (b) a package interface portion for contacting the packages; and (c) an integral hinge between said attachment portion and said package interface portion; a transition zone funnel for receiving packages from said conveying track and directing the package into said conveyor chute, said transition zone funnel including a positioner assembly for selectively positioning the outlet of said transition zone funnel between at least a first and a second position along at least two axes; and at least one unloading station downstream from said conveyor chute.

These and other aspects of the present invention will become apparent to those skilled in the art after a reading of the following description of the preferred embodiment when considered with the drawings.

BRIEF DESCRIPTION OF THE DRAWINGS

FIG. 3 is a side view of a speed control apparatus;

FIG. 4 is a rear view of the speed control apparatus;

FIG. 5 is a rear view of the speed control apparatus showing a support structure.

DESCRIPTION OF THE PREFERRED EMBODIMENTS

Figure 1:
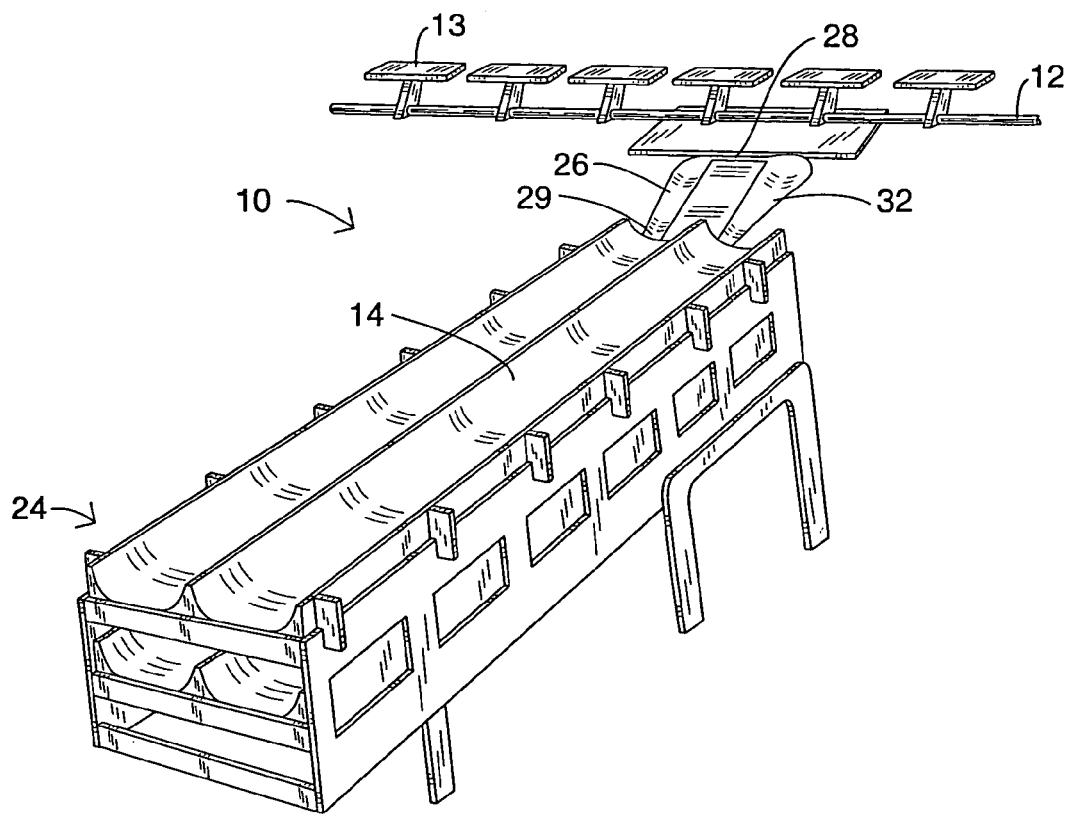
FIG. 1 is a perspective view of a package sorting conveyor apparatus constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and to FIG. 1 in particular, it will be understood that the illustrations are for the purpose of describing a preferred embodiment of the invention and are not intended to limit the invention thereto. As best seen in FIG. 1, a package sorting conveyor for transporting and sorting packages or other objects, generally designated 10, is showed constructed according to the present invention. The sorting conveyor 10 includes a conveyor track 12, a conveyor chute 14, a transition zone funnel 26, and an unloading station 24. The sorting conveyor 10 includes a train of individual carts 13 connected end-to-end which preferably form an endless loop around a closed conveyor track 12. The transition zone funnel 26 receives packages from the conveyor track 12 and includes a positioner assembly 34 (see FIG. 3) for selectively positioning the transition zone funnel 26 between at least a first and second position along at least two axes. The transition zone funnel 26 further includes an inlet 28 adjacent to the conveying track 12 at the conveyor chute 14. The transition zone funnel 26 further includes an upwardly inclined wall 32 which prevents packages from tipping over and an outlet 29 downstream from the inlet 28 to discharge packages from the transition zone funnel 26. The transition zone funnel 26 is inclined downwardly from the conveyor track 12 to the unloading station 24 and the inlet 28 is substantially flat to receive the packages being discharged by the package sorting conveyor system 10. The inlet 28 of the transition zone funnel 26 is wider than the front edge of the package and has a wider range of curvature thus, enabling the package to slide off the sorting conveyor system 10 onto the inlet 28. The downstream wall 32 is upwardly inclined and has a radius curvature of between about 6 inches and about 2½ feet. Preferably, the upwardly inclined downstream wall 32 has a radius curvature of about 1 foot. The forward direction of the packages changes about 90% from the initial direction on the conveyor track 12 to the direction of the outlet 29 on the transition zone funnel 26. The transition zone funnel 26 is made of a low friction, wear-resistant, polymeric material which is usually a high-density polyethylene.

Figure 2:
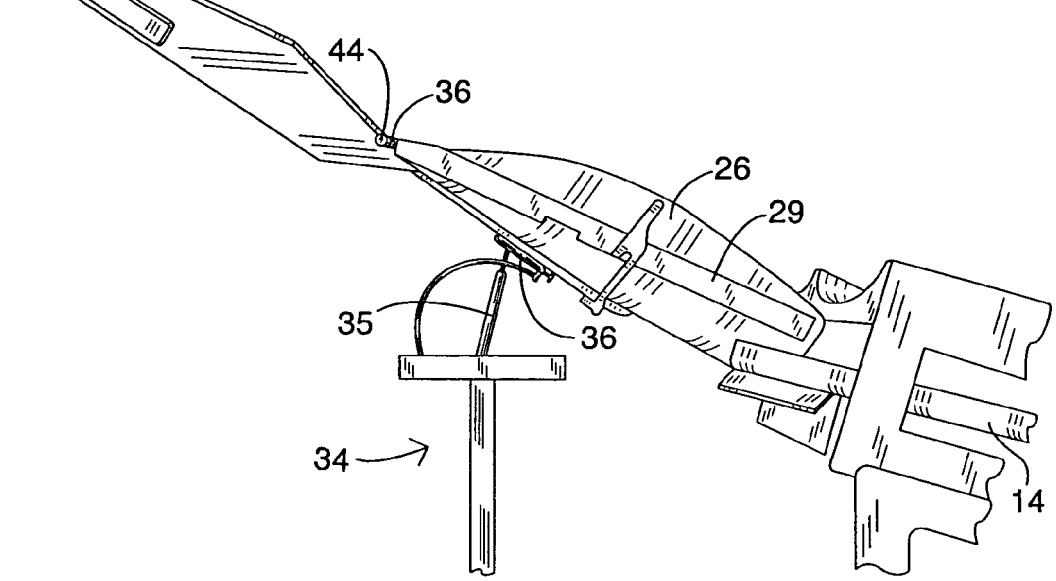
FIG. 2 is a side view of a conveyor chute and transitional zone funnel of the present invention.

Referring to FIG. 2, the positioner assembly 34 is utilized to selectively position between at least a first and second position along two axis and includes a pivot point 36 and drive means 35. The positioner assembly 34 selectively moves the transition zone funnel outlet 29 into position relative to the conveyor chute 14 to slide the packages from the conveyor track 12 onto the conveyor chute 14. The positioner assembly 34 includes a drive means 35 that moves the transition zone funnel 26 into the appropriate position to discharge the package to a desired conveyor chute 14. The positioner assembly 34 includes a hinged joint 44 that connects the transition zone funnel 26 to the conveyor track. When the vertical drive means 35 is selectively activated the drive means 35 exerts a force upon the bottom of the transition zone funnel 26 in an upward direction rotating the transition zone funnel 26 from a lower to upper position about the hinge joint 44. The transition zone funnel 26 moves by force of gravity from the upper to lower position. The transition zone funnel 26 also includes a rotary joint which, when the drive means 35 is activated, permits the transitional zone funnel 26 to move side to side. The drive means 35 further includes a rotary actuator and a linear actuator. The linear actuator is a fluid actuator. The positioner assembly 34 also includes at least two independent pivot points 36.

FIGS. 3 and 4 are a side view and a front view, respectively, of a speed control apparatus 50 for controlling the speed of packages in a conveyor chute. The speed control apparatus 50 includes an attachment portion 52 for attaching the speed control apparatus to a support structure, a package interface portion 54 for contacting packages in the chute, and an integral hinge 56 between the attachment portion and the package interface portion. The attachment portion 52 includes an edge 58 at least partially defining an opening for inserting a fastener for attaching the speed control apparatus 50 to a support structure. The package interface portion 54 is translucent for determining whether packages are resting behind the package interface portion 54. FIG. 5 is a rear view of the speed control apparatus 50 showing a support structure 60 attached to the speed control apparatus 50 for supporting the speed control apparatus.

Figure 6:
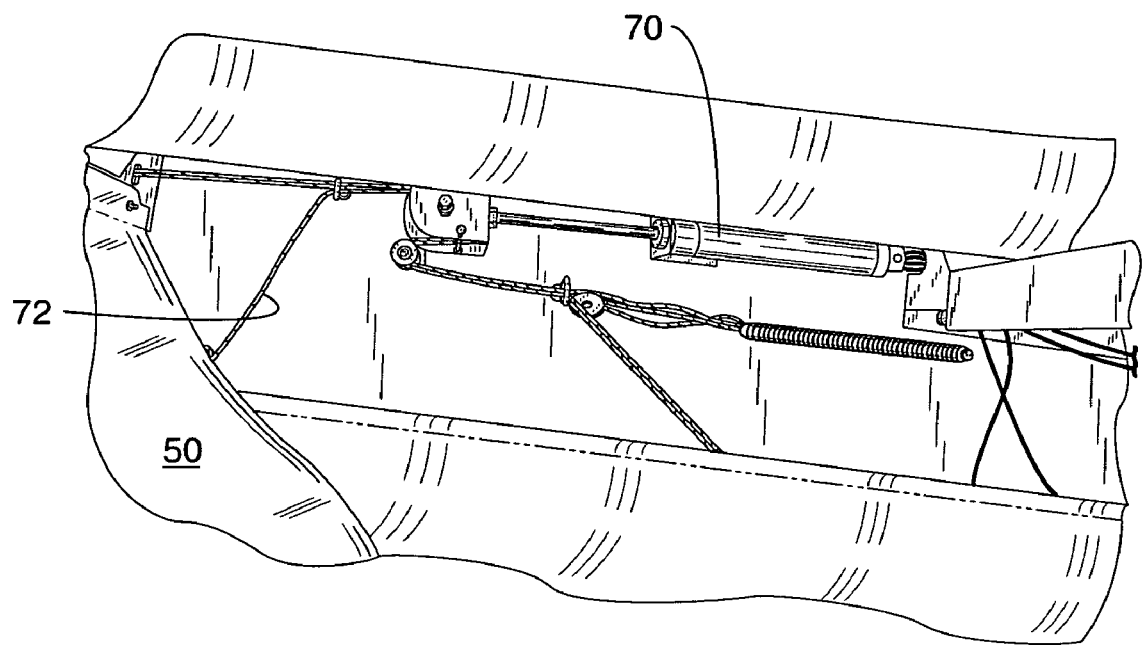
FIG. 6 is a side perspective view of an actuator for the speed control apparatus.

FIG. 6 is an actuator 70 for a speed control apparatus 50 for controlling the speed of packages in a conveyor chute. The actuator 70 selectively disengages the speed control apparatus 50. A linkage 72 connects the actuator 70 to the speed control apparatus 50.

Figure 7:
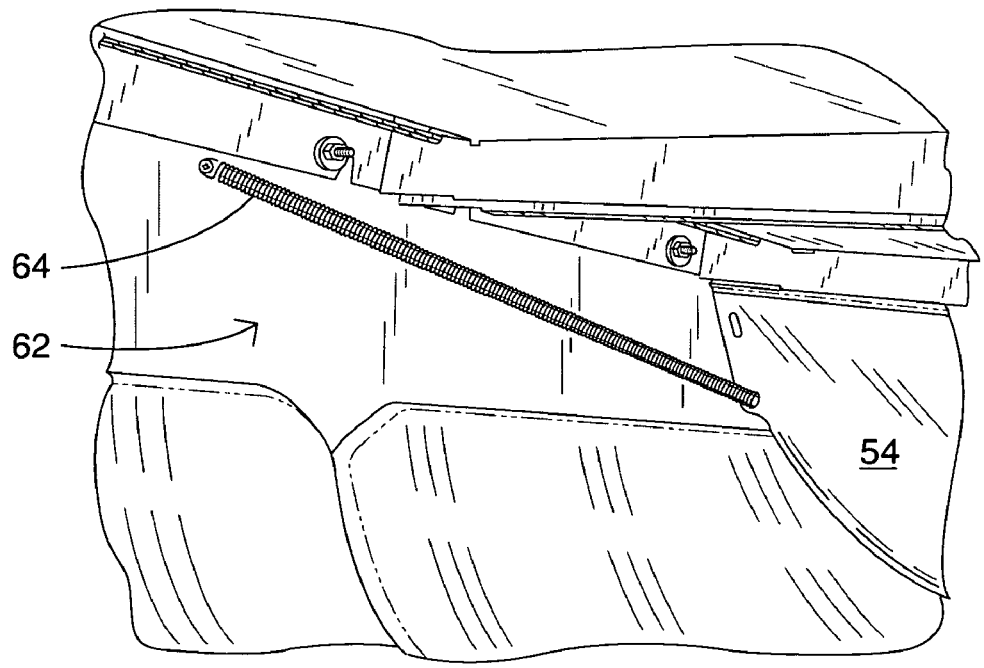
FIG. 7 is a side perspective view of a biasing device for the speed control apparatus.

FIG. 7 shows a biasing device 62 for biasing the package interface portion 54 of the speed control apparatus 50 against the flow of packages in the chute. The biasing device 62 includes a spring 64. The biasing device 62 is adjustable for varying the bias applied to the package interface portion 54 of the speed control apparatus 50.

Figure 8:
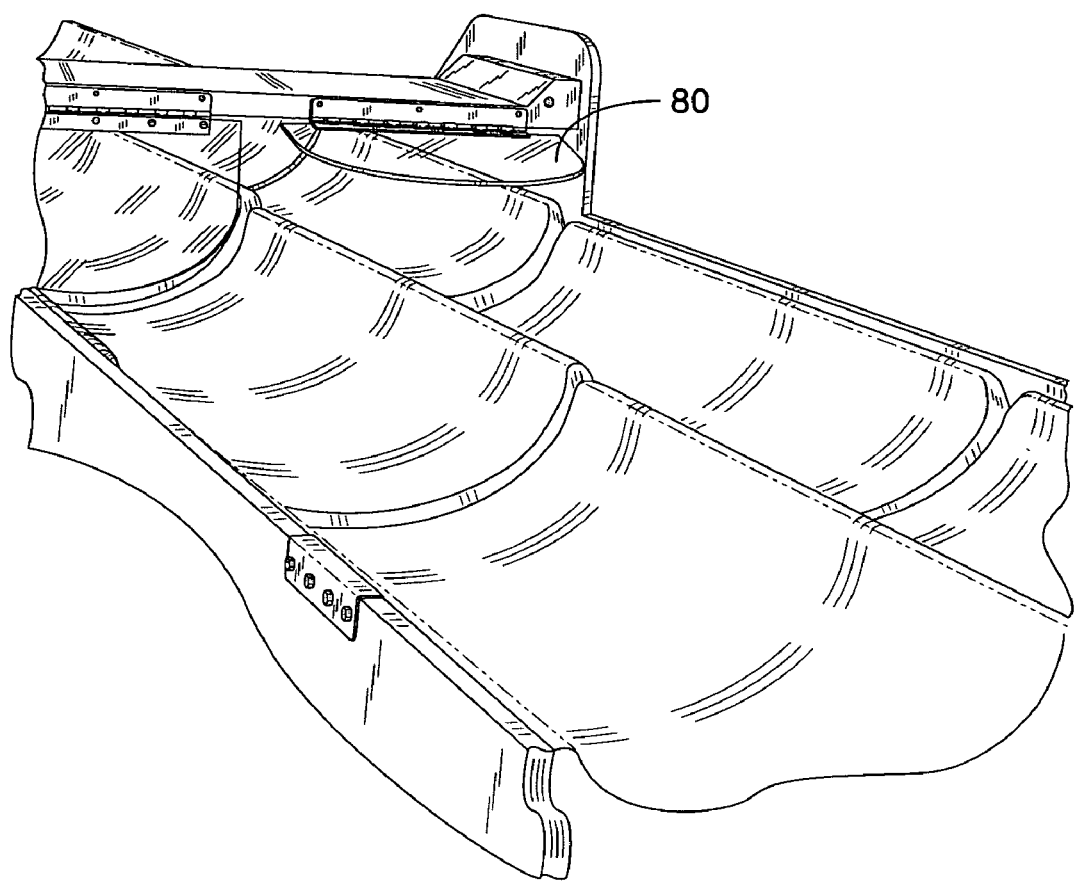
FIG. 8 is a rear perspective view of an accumulator for the speed control apparatus.

FIG. 8 is an accumulator 80 for accumulating packages upstream from the end of the conveyor chute. The accumulator 80 may be selectively engaged and disengaged, as needed. When the accumulator 80 is disengaged, packages are released to continue through the conveyor chute.

In operation, packages are discharged into the conveyor chute from the transition zone funnel. When it is desirable to control the speed of packages traveling through the chute, a series of speed control devices are engaged. The speed control devices hang into the path of the packages in the conveyor chute. When a package contacts the package interface portion of the speed control device, it is slowed as it overcomes the resistance of the device while the device pivots away from the package about the integral hinge. After the package passes by the speed control device, the device returns to its original position and thereafter controls the speed of subsequent packages in the chute. An accumulator may be used with the speed control devices to divide orders or distinct sets of packages in the chute as desired.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A package conveyor apparatus comprising:
  (a) a conveyor chute having a package path; and
  (b) a speed control device extending across said conveyor chute transverse said package path comprising:
    (i) an attachment portion for attaching said speed control apparatus to a support structure above said chute;
    (ii) a package interface portion for contacting the packages; and
    (iii) an integral hinge between said attachment portion and said package interface portion.

2. The apparatus according to claim 1 further including a support structure above said chute attached to said speed control apparatus.

3. The apparatus according to claim 1 wherein said attachment portion includes an edge at least partially defining an opening for inserting a fastener.

4. The apparatus according to claim 1 further including a biasing device for biasing said package interface portion.

5. The apparatus according to claim 4 wherein said biasing device includes a spring.

6. The apparatus according to claim 4 wherein said biasing device is adjustable for varying the bias applied to said package interface portion.

7. The apparatus according to claim 1 wherein said package interface portion is translucent for viewing packages through said package interface portion.

8. The apparatus according to claim 1 further including an actuator for selectively disengaging said speed control apparatus.

9. The apparatus according to claim 1 further including a linkage between said actuator and said package interface portion.

10. The apparatus according to claim 1 further including an accumulator for accumulating packages upstream from the end of the conveyor chute.

11. The apparatus according to claim 10 wherein the accumulator may be selectively engaged.

12. A package sorting conveyor apparatus comprising:
  (a) a conveying track;
  (b) a conveyor chute downstream from said conveying track;
  (c) a speed control device for controlling the speed of packages in said chute comprising:
    (i) an attachment portion for attaching said speed control apparatus to a support structure above said chute;
    (ii) a package interface portion for contacting the packages; and
    (iii) an integral hinge between said attachment portion and said package interface portion; and
  (d) a transition zone funnel for receiving packages from said conveying track and directing the package into said conveyor chute, said transition zone funnel including a positioner assembly for selectively positioning the outlet of said transition zone funnel between at least a first and a second position along at least two axes; and
  (e) at least one unloading station downstream from said conveyor chute.

13. The apparatus according to claim 12 wherein said transition zone funnel further includes: an inlet adjacent to said conveying track at said unloading station; an upwardly inclined downstream wall located downstream of said inlet for preventing packages from tipping over; and an outlet located downstream from said upwardly inclined downstream wall for discharging packages from said funnel.

14. The apparatus according to claim 13, wherein said inlet is substantially flat to receive said package being discharged by said package sorting conveyor system.

15. The apparatus according to claim 13, wherein said inlet is wider than the front edge of said package providing a wider range of curvature enabling the package to slide off said package sorting conveyor system onto said inlet.

16. The apparatus according to claim 13, wherein said upwardly inclined downstream wall has a radius of curvature of between about 6 inches and 2½ feet.

17. The apparatus according to claim 16, wherein said upwardly inclined downstream wall has a radius of curvature of about 1 foot.

18. The apparatus according to claim 13, wherein the forward direction of said package changes about 90° from its initial direction on said conveying track to its direction at the outlet of said funnel.

19. The apparatus according to claim 13, wherein the surface of said transition zone funnel is a low-friction, wear-resistant polymeric material.

20. The apparatus according to claim 19, wherein said material is a high-density polyethylene.

21. The apparatus according to claim 13, wherein said positioner assembly for selectively positioning between at least a first and a second position along at least two axes further includes at least one pivot point and a drive means.

22. The apparatus according to claim 21, wherein said pivot point includes an inclined axis.

23. The apparatus according to claim 21, wherein said pivot point includes at least two independent pivots.

24. The apparatus according to claim 21, wherein said drive means includes a rotary actuator.

25. The apparatus according to claim 21, wherein said drive means includes a linear actuator.

26. The apparatus according to claim 25, wherein said linear actuator is a fluid actuator.

27. The apparatus according to claim 12 further including a support structure attached to said speed control apparatus.

28. The apparatus according to claim 12 wherein said attachment portion includes an edge at least partially defining an opening for inserting a fastener.

29. The apparatus according to claim 12 further including a biasing device for biasing said package interface portion.

30. The apparatus according to claim 29 wherein said biasing device includes a spring.

31. The apparatus according to claim 29 wherein said biasing device is adjustable for varying the bias applied to said package interface portion.

32. The apparatus according to claim 12 wherein said package interface portion is translucent for viewing packages through said package interface portion.

33. The apparatus according to claim 12 further including an actuator for selectively disengaging said speed control apparatus.

34. The apparatus according to claim 12 further including a linkage between said actuator and said package interface portion.

35. The apparatus according to claim 12 further including an accumulator for accumulating packages upstream from the end of the conveyor chute.

36. The apparatus according to claim 35 wherein the accumulator may be selectively engaged.

* * * * *